United States Patent [19]

Ott

[11] 4,113,165
[45] Sep. 12, 1978

[54] SOLDERING APPARATUS

[75] Inventor: Hans Ott, Adliswil, Switzerland

[73] Assignee: Meteor AG, Rüschlikon, Switzerland

[21] Appl. No.: 835,032

[22] Filed: Sep. 20, 1977

[30] Foreign Application Priority Data

Oct. 7, 1976 [CH] Switzerland .................. 12678/76

[51] Int. Cl.² .............................................. B23K 3/06
[52] U.S. Cl. ...................................... 228/36; 228/56; 118/421
[58] Field of Search ....................... 228/33, 36, 40, 56; 118/421

[56] References Cited

U.S. PATENT DOCUMENTS

| 2,344,589 | 3/1944 | Bogner | 228/33 |
| 2,857,878 | 10/1958 | Matson et al. | 118/421 |
| 3,168,885 | 2/1965 | Weiss | 228/36 X |
| 3,980,219 | 9/1976 | Schmid | 228/36 X |

Primary Examiner—Al Lawrence Smith
Assistant Examiner—K. J. Ramsey
Attorney, Agent, or Firm—Cushman, Darby & Cushman

[57] ABSTRACT

The disclosure embraces a soldering apparatus which includes a vessel having an open top for containing a molten soldering material such as tin, a ladle having a scoop portion and a tank which is connected to the scoop by a pipe; the ladle is movable into and out of the vessel whereby the tank and scoop will become filled with the soldering material upon submergence of the ladle in the vessel; the tank has a selected dimension and lower height relative to the scoop so that the soldering material will form a meniscus bubble over its surface which will be free of slag or oxidation material to thereby present a clean soldering bath to the elements to be soldered when the tank is raised out of the soldering bath of the vessel.

3 Claims, 2 Drawing Figures

SOLDERING APPARATUS

BACKGROUND AND BRIEF DESCRIPTION OF THE INVENTION

The present invention relates to soldering apparatus and more particularly, to an apparatus which will automatically supply a fresh quantity of soldering material to an article to be soldered.

It is known to use soldering baths where the soldering operation is carried out automatically, for example, on the ends of coil wires on the bodies of electromagnetic coils which are provided with connecting pegs for the lead line. In such apparatus, the problem of oxide formation on the surface of the soldering bath has complicated the automatic sequence of the operation. In addition, changes in the solder bath where a tin alloy is being used have occurred which result in electrical connections which are inferior. The degradation of the tin alloy bath is due to the repeated submergence of the elements being soldered into the soldering bath. In attempting to solve these problems, the prior art has suggested the use of scrapers moving over the surface of the solder bath to remove the oxide layers, on the one hand, and on the other hand, the use of a lid which covers the bath except during a soldering operation. In such arrangements, the amount of soldering material that is lost increases in direct proportion to the frequency of the scraping of the surface of the bath.

The foregoing disadvantages are avoided by the present invention which provides a soldering apparatus which repeatedly presents a properly alloyed bath to the elements to be soldered by use of a separate ladle having a solder bath tank which is submerged in a vessel containing a large quantity of solder bath material and where, by the act of submergence, the soldering material in the separate tank is replenished.

In a preferred embodiment, the advantages of the present invention are obtained by the use of a ladle having a soldering bath tank which is communicated adjacent its bottom with a separate scoop whereby the upper lip of the scoop lies in a horizontal plane that is vertically spaced above the upper lip of the tank. The tank and the scoop are movable jointly by a mechanism that raises and lowers the ladle periodically relative to the vessel containing the molten solder bath.

Since the scoop and the solder bath tank are in flow communication by means of a pipe, which extends from the bottom of the scoop to the bottom of the tank, the bath level in the scoop will drop as the scoop and tank are lifted out of the solder bath vessel. Since the tank will already be completely filled by virtue of its submergence into the bath of the vessel, the solder bath material will overflow the upper lip of the soldering tank by a predetermined quantity unitl the level of solder bath in the scoop equals the level in the tank. As a result of the surface tension of the molten soldering material and the dimension of the tank, a meniscus or bubble will develop over the surface surrounded by the upper lip of the tank. By a proper selection of the dimensions of the tank, and proper regulation of the heat of the solder bath, the configuration of the meniscus will be repeatable within close tolerances upon each submerging and raising of the tank and scoop from the solder bath. This will greatly simplify the soldering operation where, for example, elements are automatically positioned above the solder bath and submerged into the meniscus of soldering material when the tank is raised from the solder vessel. The quality of the soldering will be improved by the fact that the soldering material in the tank will contain only fresh solder material by virtue of the submergence of the scoop and solder tank into the main vessel bath and the overflow of solder caused by the difference in height of the scoop above the upper lip of the tank when the scoop and tank are raised from the main solder bath.

By the proper dimensioning of the scoop and the soldering bath vessel, the exposure time for the tin outside of the main bath can be maintained at a much shorter interval than has previously been the case. Also, by close dimensioning of the diameter of the solder bath tank as well as its horizontal distance from the scoop, the apparatus of the present invention can be employed to effect soldering where space limitations are significant such as is the case with connecting pegs or lead lines which are of a very short length on the bodies of electromagnetic coils.

The foregoing and other advantages will become apparent as consideration is given to the following detailed description taken in conjunction with the accompanying drawings, in which:

DETAILED DESCRIPTION OF THE INVENTION

Figure 1:
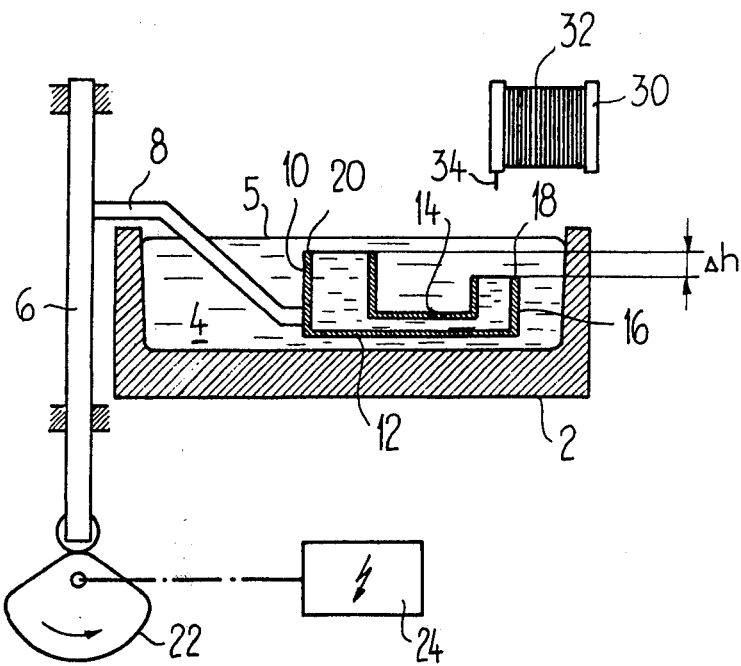
FIG. 1 is a schematic illustration in vertical section of the soldering apparatus with the soldering tank and scoop in a submerged position.

Referring now to the drawings, there is shown in FIG. 1, a vessel 2 which may be located by the usual support means at a soldering station of an automatic coil winding machine such as is disclosed in co-pending application Ser. No. 804,241, filed June 7, 1977, in the name of Schmid. The vessel 2 will contain a tinning bath 4, the level of which is designated by the numeral 5. The vessel 2 is of the type that can be heated by any suitable means (not shown) for maintaining the soldering material in a molten state.

On a rod 6 which is guided by suitable means for vertical movement adjacent the vessel 2, a carrier arm 8 is attached which supports a ladle in the form of a cylindrical scoop 10 and tank 16. The scoop 10 communicates with the soldering bath tank 16 through a connecting pipe 14 which extends from the bottom 12 of the scoop 10 to the bottom of the tank 16. Thus, the connecting pipe 14 will rigidly connect the tank 16 with the scoop 10 so that the scoop 10 and tank 16 will be moved simultaneously upon actuation of the rod 6. The upper lip or edge 18 of the tank 16 which has a smaller diameter than the cylindrical scoop 10 lies in a plane that is vertically spaced by a distance $\Delta H$ below the plane in which the lip or edge 20 of the scoop 10 lies.

Figure 2:
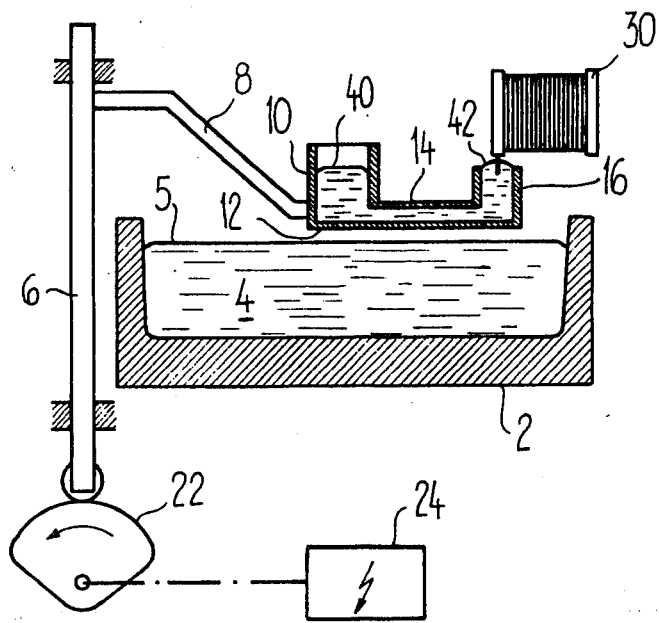
FIG. 2 is an illustration similar to that of FIG. 1 but showing the tank and scoop in an elevated position.

To effect movement of the rod 6, the lower end thereof is supported by a cam disc 22 which is in driving connection with a motor 24. A suitable control arrangement (not shown) is employed to actuate the motor 24 to effect one revolution of the cam disc through 360°. This will effect a vertical reciprocation of the rod 6 which will effect a lifting of the scoop 10 and tank 16 out of the bath 4 as illustrated in FIG. 2 and then return the scoop and tank to the position illustrated in FIG. 1.

As will be understood by reference to the above-identified application, Ser. No. 804,241, above the primary or main bath 4 in vessel 2, can be arranged a horizontal path of movement of a wound coil on a coil winding machine or turning table (not shown). Such a coil is indicated at 30 with its winding 32 and a connecting peg 34 oriented towards the solder bath tank 16.

In the submerged position of the scoop 10 and tank 16 as shown in FIG. 1, which is the rest position, the lip 20 of the scoop 10 lies below the level 5 of the bath 4. As a result, both the scoop 10 and the tank 16 are filled upon submergence with soldering material such as a tin alloy from the bath 4.

With the driving motor 24 actuated as aforesaid, when a coil 30 is located above the bath 4, the soldering process is commenced. The cam disc 22 will rotate to lift the suspension rod 6 and the carrier arm 8 will move vertically to lift the scoop 10 and the tank 16. The upper edge of the lip 20 of the scoop 10 will emerge first from the bath 4 because of its greater vertical height above the contact point with the arm 8 than that of the upper edge 18 of the tank 16. Thereupon, the molten solder will flow out of the scoop 10 in the direction of tank 16 whereby the level of tin 40 in the scoop 10 will drop approximately the distance Δ H as the elements reach their positions illustrated in FIG. 2. The excess tin in the soldering bath tank 16 will flow over the edge 18 thereof back into the main bath 4.

Due to the effect of surface tension on the soldering solution, a meniscus 42 will develop over the edge 18. The position of the coil 30 with its peg 34 should be chosen so that the uppermost limit of travel of the arm 18 will effect immersion of the peg 34 in the meniscus 42. Thus, a connecting wire (not shown) of the winding 32 will be soldered to the connecting peg 34.

As the tank 16 and scoop 10 are lowered below the level 5 of the main bath 4, the scoop will be completely filled with soldering solution again to replenish the quantity lost by the overflow over the upper lip 18 of tank 16.

A scraper (not shown) may be employed to free the surface of the main bath 4 of slag or the skin of oxide which forms thereon. However, the overflow of the soldering solution from tank 16 will assure the presentation of fresh or uncontaminated soldering solution to the elements to be soldered. It is possible without any difficulty to provide several pairs of scoops and soldering bath tanks simultaneously from the same main bath 4 and to operate them jointly. In addition, several soldering bath tanks 16 can be connected via a plurality of pipes 14 to a single scoop 10.

Having described the invention, it will be apparent to those skilled in this art that various other modifications may be made thereto without departing from the spirit and scope of the present invention as defined in the appended claims.

What is claimed is:

1. Soldering apparatus comprising a vessel for containing a molten soldering material, a ladle including a tank and a scoop, said ladle being movable into and out of said vessel so as to fill said tank and scoop with soldering material contained in said vessel, said tank and scoop portion being in fluid communication and each having a lip with the lip of said scoop lying in a horizontal plane that is spaced vertically above the lip of said tank.

2. The soldering apparatus as claimed in claim 1, wherein the volume of said scoop is greater than the volume of said tank.

3. The soldering apparatus as claimed in claim 1, wherein said scoop is connected through a pipe with said tank so as to be movable therewith.

* * * * *